United States Patent
Li (10) Patent No.: US 10,122,912 B2
(45) Date of Patent: Nov. 6, 2018

(54) DEVICE AND METHOD FOR DETECTING REGIONS IN AN IMAGE

(71) Applicant: SONY CORPORATION, Tokyo (JP)

(72) Inventor: Pingshan Li, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/483,783

(22) Filed: Apr. 10, 2017

(65) Prior Publication Data

US 2018/0295273 A1    Oct. 11, 2018

(51) Int. Cl.
| | |
|---|---|
| *H04N 5/232* | (2006.01) |
| *G06K 9/46* | (2006.01) |
| *G06K 9/62* | (2006.01) |
| *G06T 7/11* | (2017.01) |
| *G06T 7/136* | (2017.01) |

(52) U.S. Cl.
CPC ....... *H04N 5/23212* (2013.01); *G06K 9/4652* (2013.01); *G06K 9/4671* (2013.01); *G06K 9/627* (2013.01); *G06T 7/11* (2017.01); *G06T 7/136* (2017.01)

(58) Field of Classification Search
CPC ........ H04N 5/23212; G06T 7/136; G06T 7/11
See application file for complete search history.

(56) References Cited

U.S. PATENT DOCUMENTS

| | | | | |
|---|---|---|---|---|
| 5,512,951 A | * | 4/1996 | Torii | ................. H04N 5/23212 348/345 |
| 2009/0129674 A1 | * | 5/2009 | Lin | .......................... G06T 5/50 382/173 |
| 2013/0307938 A1 | | 11/2013 | Kim et al. | |
| 2015/0181168 A1 | * | 6/2015 | Pahalawatta | ........... H04N 19/80 348/14.12 |

FOREIGN PATENT DOCUMENTS

| | | |
|---|---|---|
| CN | 102801997 B | 6/2014 |
| WO | 2012074361 A1 | 6/2012 |

OTHER PUBLICATIONS

Dahan, et al., "Combining color and depth for enhanced image segmentation and retargeting", Vis Comput, vol. 28 2012, pp. 1181-1193.

* cited by examiner

*Primary Examiner* — Ahmed A Berhan
(74) *Attorney, Agent, or Firm* — Chip Law Group (57) ABSTRACT

Various aspects of a device and method for detection of regions based on sensor data for autofocus are disclosed herein. In accordance with an embodiment, the method includes receipt of a depth of filed (DOF) information of a scene viewed using an image-capturing device of the electronic device. The one or more images of the scene are segmented into a plurality of candidate segmented regions based on the received DOF information. One of the plurality of candidate segmented regions is determined as a region-of-interest to autofocus on the determined candidate segmented region.

19 Claims, 6 Drawing Sheets

DEVICE AND METHOD FOR DETECTING REGIONS IN AN IMAGE

CROSS-REFERENCE TO RELATED APPLICATIONS/INCORPORATION BY REFERENCE

None.

FIELD

Various embodiments of the disclosure relate to image processing for autofocus. More specifically, various embodiments of the disclosure relate to detection of regions in an image based on sensor data for autofocus.

BACKGROUND

Advancements in the field of image processing and sensor technology have extended the functionalities of various electronic devices and associated applications. Traditional approaches, for detection of a region or an object-of-interest, may not be specifically designed for autofocus applications. Such approaches usually depend on spatial information of image(s) to detect a region or an object-of-interest. Such approaches may also utilize various background and foreground segregation techniques. In certain scenarios, various portions of a single object (that may be the detected region) in the scene may have different depths. In certain other scenarios, the detected region and other regions (such as background) in the scene may have the same depth. Thus, the detection may not be accurate when such traditional approaches are applied to autofocus applications as only one depth may be focused. Consequently, the image of the scene may be captured where a region-of-interest may be out of focus. Therefore, an improved method may be required for accurate detection of a region-of-interest for autofocus applications.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A device and method for detection of regions in an image based on sensor data for autofocus is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed device and method for detection of regions in an image based on sensor data for autofocus. Exemplary aspects of the disclosure may comprise a method that may receive depth of field (DOF) information of a scene viewed by an image-capturing device of an electronic device. One or more images of the scene may be segmented into a plurality of candidate segmented regions based on the received DOF information. Further, one of the plurality of candidate segmented regions may be determined as a region-of-interest to autofocus on the determined candidate segmented region.

In accordance with an embodiment, a saliency map for the one or more images of the scene may be generated based on an optical flow technique. The saliency map for one or more images of the scene may be generated based on color, intensity, orientation, texture information of one or more pixels in the one or more images of the scene, and/or a motion value of one or more pixels of one or more objects in the one or more images of the scene.

In accordance with an embodiment, the generated saliency map may be overlapped with each of the plurality of candidate segmented regions for the determination of one of the plurality of candidate segmented regions as the region-of-interest. The determination of one of the plurality of candidate segmented regions as the region-of-interest may be validated. The validation may occur when the overlap between the determined candidate segmented region and the regions with high saliency values in the generated saliency map is a maximum as compared to other candidate segmented regions of the plurality of candidate segmented regions. An alternative approach can be that the depth-of-interest is determined by calculating the mean DOF value or median DOF value of the regions with high saliency values in the saliency map.

In accordance with an embodiment, the DOF information corresponds to a plurality of DOF values assigned to different portions of the one or more images of the scene by a depth sensor of the electronic device. The plurality of candidate segmented regions may comprise different DOF values. The determination of one of the plurality of candidate segmented regions as the region-of-interest may be further based on an area of the plurality of candidate segmented regions.

In accordance with an embodiment, the determination of one of the plurality of candidate segmented regions as the region-of-interest may be further based on training-based classification method and/or one or more pre-defined rules. The training-based classification method may use historical data corresponding to a set of candidate segmented regions obtained from previous segmentation operations. An image that corresponds to the viewed scene may be captured with the determined region-of-interest in focus.

Figure 1:
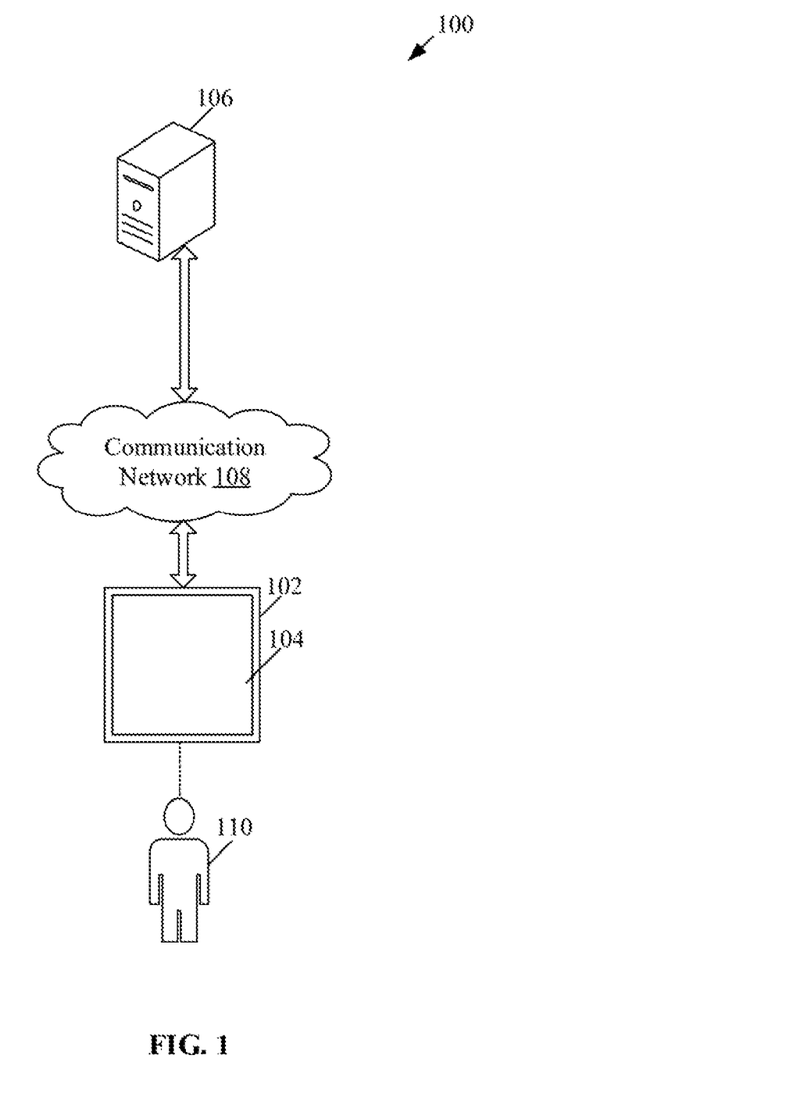
FIG. 1 is a block diagram that illustrates a network environment, in accordance with an embodiment of the disclosure.

FIG. 1 is a block diagram that illustrates a network environment, in accordance with an embodiment of the disclosure. With reference to FIG. 1, there is shown a network environment 100. The network environment 100 may include an electronic device 102. The electronic device 102 may include a display screen 104. There is further shown a server 106, a communication network 108, and a user 110. The user 110 may be associated with the electronic device 102. The electronic device 102 may be communicatively coupled to the server 106, via the communication network 108.

The electronic device 102 may comprise suitable logic, circuitry, interfaces, and/or code that may be configured to identify a region-of-interest to autofocus while capturing an image. Examples of the electronic device 102 may include, but are not limited to, a smartphone, a digital camera, a tablet computer, a wearable electronic device, and/or other such computing devices.

The display screen 104 may comprise suitable circuitry and/or interfaces that may be configured to display data received from the electronic device 102. In accordance with an embodiment, the display screen 104 may be configured to receive one or more input from one or more users, such as the user 110. The one or more input may be received from the user 110 by means of a virtual keypad or a stylus. Further, the one or more input may also correspond to a touch-based, and/or a gesture-based input. The display screen 104 may be further configured to display an output associated with the captured image or video to the user 110. The output may include the captured image or video frame. The display screen 104 may be realized through several known technologies, such as, but not limited to, Liquid Crystal Display (LCD) display, Light Emitting Diode (LED) display, and/or Organic LED (OLED) display technology.

The server 106 may comprise suitable logic, circuitry, interfaces, and/or code that may be configured to receive and store historical data from the electronic device 102. The historical data may include a set of candidate segmented regions and corresponding determined region-of-interest obtained from various segmentation operations in the electronic device 102. The server 106 may be implemented by use of several technologies that are well known to those skilled in the art. Examples of the server 106 may include, but are not limited to, a cloud server, an application server, a database server, a web server, a file server, and/or their combination.

The communication network 108 may include a medium through which the electronic device 102 may communicate with one or more servers, such as the server 106. Examples of the communication network 108 may include, but are not limited to, the Internet, a cloud network, a Wireless Fidelity (Wi-Fi) network, a Wireless Local Area Network (WLAN), a wireless personal area network (WPAN), a wireless wide area network (WWAN), a Local Area Network (LAN), a plain old telephone service (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), Long Term Evolution (LTE), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the electronic device 102 may be configured to receive one or more images of a scene viewed by use of an image-capturing device of the electronic device 102. The one or more images may be received when the user 110 points the electronic device 102 towards the scene with intent to capture an image of the scene. For example, the user 110 may launch an image-capturing application at the electronic device 102 and point the electronic device 102 towards the scene. The one or more images may correspond to a video or a preview within the field-of-view of the image-capturing device as viewed through the image-capturing device before capturing of the image.

In accordance with an embodiment, the electronic device 102 may be configured to receive depth of field (DOF) information of the scene viewed by use of the image-capturing device of the electronic device 102. The DOF information may correspond to a plurality of DOF values assigned to different portions of the one or more images, such as the video, of the scene. The plurality of DOF values may be output obtained in real-time or near real-time by a depth sensor of the electronic device 102.

In accordance with an embodiment, the electronic device 102 may be configured to segment the one or more images of the scene into a plurality of candidate segmented regions based on the received DOF information. In accordance with an embodiment, the electronic device 102 may be configured to generate a saliency map for the one or more images of the scene. The saliency map may be generated based on an optical flow technique. In accordance with an embodiment, the saliency map may be generated in parallel to the segmentation of the one or more images.

In accordance with an embodiment, the electronic device 102 may be configured to determine one of the plurality of candidate segmented regions as a region-of-interest. One of the plurality of candidate segmented regions may be determined as the region-of-interest based on the received DOF information. The electronic device 102 may then autofocus on the determined candidate segmented region as the region-of-interest.

In accordance with an embodiment, the determination of one of the plurality of candidate segmented regions as the region-of-interest may be further based on an area of the plurality of candidate segmented regions. For example, the scene may include an object. Different parts of the object may have different depths. Areas other than the main object may have the same depth. The different depths may correspond to different areas of the one or more images. The objective may be to select the right depth by evaluating the area of that depth.

In accordance with an embodiment, the electronic device 102 may be configured to overlap the generated saliency map with each of the plurality of candidate segmented regions for the determination of one of the plurality of candidate segmented regions as the region-of-interest. The electronic device 102 may be configured to validate the determination of the one of the candidate segmented regions as the region-of-interest based on the overlap. The determined candidate segmented region as the region-of-interest may be validated when the overlap between the candidate segmented region and the regions with high saliency values (i.e. saliency values greater than a threshold) in the generated saliency map is maximum as compared to other candidate segmented regions of the plurality of candidate segmented regions. An alternative approach can be that the depth-of-interest is determined by calculating the mean DOF value or median DOF value of the regions with high saliency values (i.e. saliency values greater than a threshold) in the saliency map. In some embodiments, the depth-of-interest may be used at least for the determination of one of the plurality of candidate segmented regions as the region-of-interest.

In accordance with an embodiment, the electronic device 102 may be configured to determine one of the candidate segmented region as a region-of-interest based on training-based classification method and/or one or more pre-defined rules. The training-based classification method may use the historical data obtained from previous segmentation operations to train a classifier. The training may be performed at the electronic device 102 or the server 106.

Figure 2:
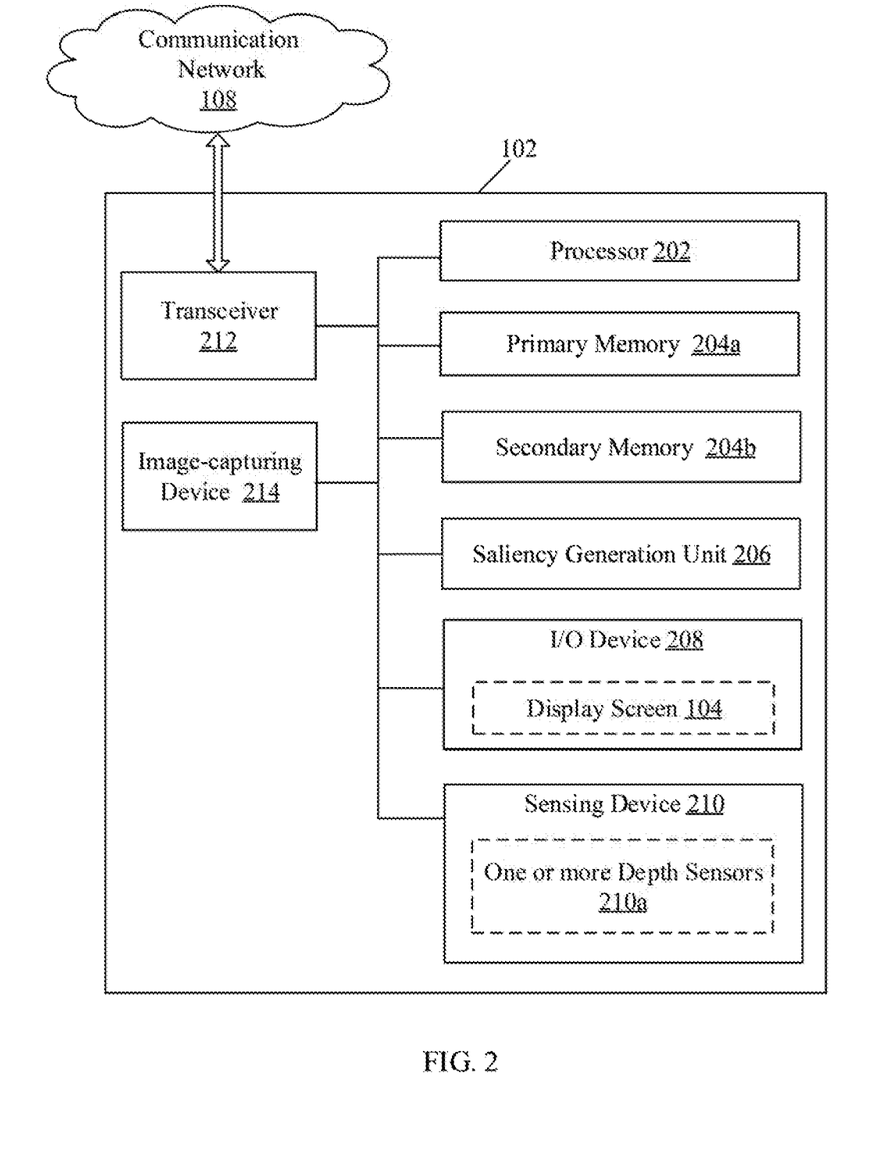
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include one or more processors, such as a processor 202. The electronic device 102 may further include a primary memory 204a, a secondary memory 204b, a saliency generation unit 206, one or more input/output (I/O) devices, such as I/O device 208, and/or a sensing device 210. The sensing device 210 may include one or more depth sensors 210a. There is also shown a transceiver 212 and an image-capturing device 214 in the electronic device 102. With reference to FIG. 2, there is further shown the display screen 104 and the communication network 108, as described in FIG. 1

In accordance with an embodiment, the processor 202 may be communicatively coupled to the primary memory 204a, the secondary memory 204b, the saliency generation unit 206, the I/O device 208, the sensing device 210, the transceiver 212, and the image-capturing device 214. The transceiver 212 may be configured to communicate with one or more servers, such as the server 106, via the communication network 108.

The processor 202 may comprise suitable logic, circuitry, interfaces, and/or code that may be configured to execute a set of instructions stored in the secondary memory 204b. The processor 202 may be further configured to receive input that may launch the image-capturing application pre-stored in the secondary memory 204b. The processor 202 may be further configured to segment the one or more images, such as a video that corresponds to the FOV of the scene, into a plurality of candidate segmented regions based on DOF information. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The primary memory 204a may comprise suitable logic, circuitry, and/or interfaces that may be configured to temporarily store (buffer) the one or more images corresponding to the scene when the scene is viewed by use of the image-capturing device 214. Examples of implementation of the primary memory 204a may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), cache memory, and/or other volatile memory.

The secondary memory 204b may comprise suitable logic, circuitry, and/or interfaces that may be configured to store a set of instructions executable by the processor 202. The secondary memory 204b may be configured to store the image (with focus on the region-of-interest) of the scene captured by the user 110. The secondary memory 204b may further be operable to store one or more algorithms, such as a motion detection algorithm, a depth detection algorithm, a human detection algorithm, a face detection algorithm, a color detection algorithm, an intensity detection algorithm, a texture detection algorithm, and/or an orientation detection algorithm. The secondary memory 204b may further be configured to store operating systems and associated applications. Examples of implementation of the secondary memory 204b may include, but are not limited to, Read Only Memory (ROM), a flash memory, Hard Disk Drive (HDD), a Solid-State Drive (SSD), a Secure Digital (SD) card, and/or a removable media drive.

The saliency generation unit 206 may comprise suitable logic, circuitry, interfaces, and/or code that may be configured to generate the saliency map based on an optical flow method. In accordance with an embodiment, the saliency generation unit 206 may further be configured to generate the saliency map based on the color, intensity, orientation, and texture information of one or more pixels of the one or more images of the scene.

The I/O device 208 may comprise suitable logic, circuitry, interfaces, and/or code that may be configured to receive an input from a user, such as the user 110. The I/O device 208 may be further configured to provide an output to the user 110. The I/O device 208 may comprise various input and output devices that may be configured to communicate with the processor 202. Examples of the input devices may include, but are not limited to, the image-capturing device 214, a camcorder, a touch screen, a joystick, a microphone, a motion sensor, a light sensor, and/or a docking station. Examples of the output devices may include, but are not limited to, the display screen 104, a projector screen, and/or a speaker.

The sensing device 210 may comprise suitable logic, circuitry, and/or interfaces that may be configured to detect one or cues, and generate a corresponding output, such as sensor data. The sensing device 210 may comprise one or more depth sensors 210a for the generation of the DOF information for the one or more images of the scene. The sensing device 210 may further comprise one or more other sensors. Examples of the one or more other sensors may include, but are not limited to, a motion sensor, an accelerometer, a global positioning system (GPS) sensor, a compass or magnetometer, an ambient light sensor, a tricorder, a gyroscope, a proximity sensor, an image sensor, a lux meter, a touch sensor, and/or an infrared sensor.

The transceiver 212 may comprise suitable logic, circuitry, interfaces, and/or code that may be configured to communicate with one or more servers, such as the server 106, via the communication network 108 (as shown in FIG. 1). The transceiver 212 may implement known technologies to support wired or wireless communication of the electronic device 102 with the communication network 108. The transceiver 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The image-capturing device 214 may comprise suitable logic, circuitry, interfaces, and/or code that may be configured to capture a video or an image of a scene. The image-capturing device 214 may refer to an in-built camera or one or more image sensors of the electronic device 102, such as a smartphone. The image-capturing device 214 may include a viewfinder that may be used to compose the scene captured by the image-capturing device 214. The image-capturing device 214 may be configured to store the one or images, such as a video, of the scene viewed through the viewfinder in a local buffer, such as the primary memory 204*a* before an image is actually captured. The image-capturing device 214 may be further configured to store the captured image with the determined region-of-interest in focus, in the secondary memory 204*b*, under the control of the processor 202.

Figure 3A:
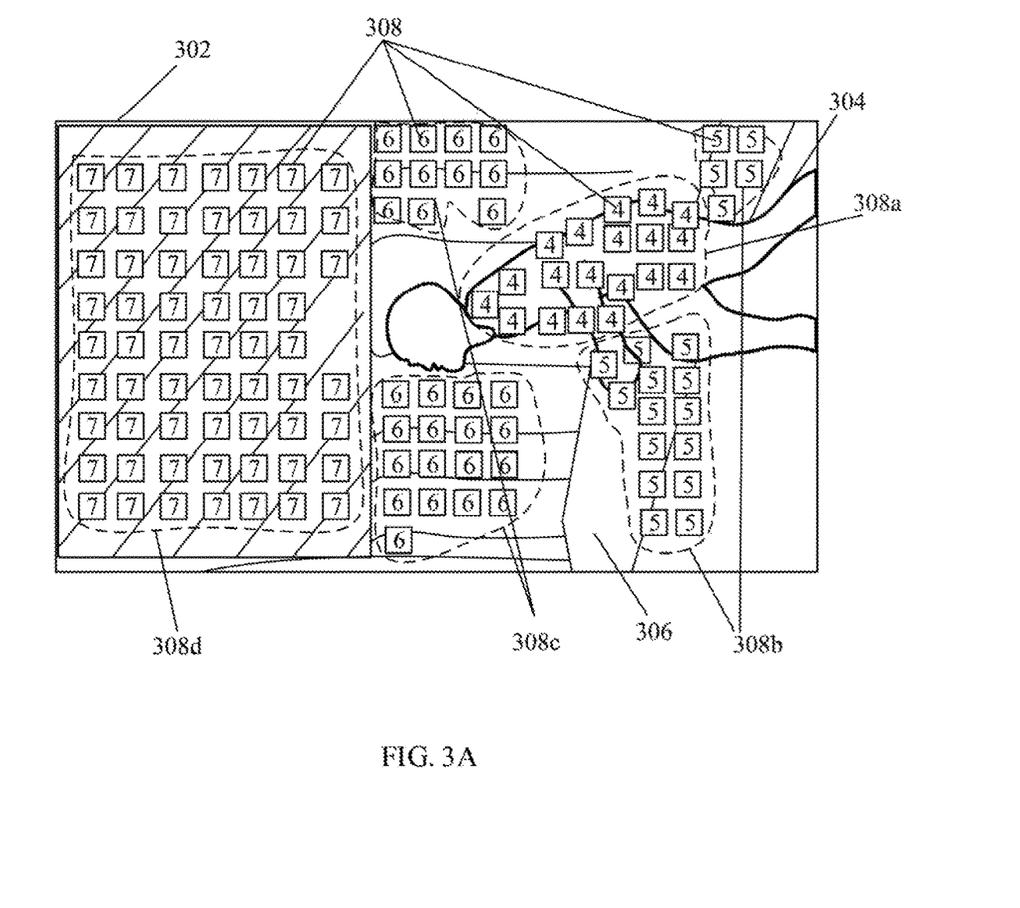
FIGS. 3A, 3B, and 3C, collectively, illustrate an exemplary scenario for implementation of the disclosed device and method for detection of regions in an image based on sensor data for autofocus, in accordance with an embodiment of the disclosure.

In operation, the processor 202 may be configured to receive one or more images of a scene viewed by use of the image-capturing device 214. The one or more images may correspond to a video or a preview within the field-of-view of the image-capturing device 214 as viewed through the image-capturing device 214 before capturing of an image. In accordance with an embodiment, the processor 202 may be configured to receive DOF information of the scene from the one or more depth sensors 210*a*. The DOF information may be generated by the one or more depth sensors 210*a* in real-time or near real-time while viewing the scene by use of the image-capturing device 214. The DOF information may correspond to a plurality of DOF values assigned to different portions of the one or more images, such as the video, of the scene. The plurality of DOF values may be overlaid on one or more images while viewing the scene by use of the image-capturing device 214. An example of the overlaying of the plurality of DOF values on the one or more images while viewing the scene, is shown in FIG. 3A.

In accordance with an embodiment, the processor 202 may be configured to segment the one or more images of the scene into a plurality of candidate segmented regions based on the received DOF information. A region with same DOF information may be segmented as one region. In accordance with an embodiment, the processor 202 may be configured to determine one of the plurality of candidate segmented regions as a region-of-interest. One of the plurality of candidate segmented regions may be determined as the region-of-interest based on the received DOF information. The processor 202 may then autofocus on the determined candidate segmented region as the region-of-interest.

In accordance with an embodiment, the determination of one of the plurality of candidate segmented regions as the region-of-interest may be further based on an area of the plurality of candidate segmented regions. If an area of a certain candidate segmented region is less than a threshold value, the candidate segmented region may not be considered for region-of-interest detection.

In accordance with an embodiment, the processor 202 may be configured to generate a saliency map for the one or more images of the scene. The saliency map may be generated based on an optical flow technique. In accordance with an embodiment, the saliency map may be generated in parallel with the segmentation of the one or more images. The saliency generation unit 206 may be configured to compare a current frame and a previous frame of the one or more images of the scene. The saliency generation unit 206 may be configured to determine motion information of one or more pixels associated with an object in the current frame with respect to pixels associated with a similar object in the previous frame of the scene. The motion information of the one or more pixels may be determined by use of one or more motion detection algorithms. Examples of the one or more motion detection algorithms may include, but are not limited to, a frame subtraction algorithm, a background subtraction algorithm, and an optical flow algorithm.

The saliency generation unit 206 may be configured to determine an optical flow of the one or more pixels in the current frame with respect to corresponding pixels in the previous frame of the one or more images of the scene. Accordingly, the saliency generation unit 206 may be configured to determine the optical flow of the one or more pixels associated with the object in the current frame with respect to the one or more pixels associated with the similar object in the previous frame of the one or more images of the scene.

In accordance with an embodiment, the saliency generation unit 206 may be further configured to determine spatial distance information of the one or more pixels associated with the object in the current frame with respect to the one or more pixels associated with the similar object in the previous frame. Such spatial distance information may be determined by use of one or more mean-shift algorithms, such as an anisotropic kernel mean shift algorithm, which may be retrieved from the secondary memory 204*b*. The spatial distance of the one or more pixels may be determined based on comparison of the current frame with the previous frame. Notwithstanding, the disclosure may not be so limited, and other techniques known in the art may be implemented to determine spatial distance information, without deviation from the scope of the disclosure.

In accordance with an embodiment, the saliency generation unit 206 may be configured to assign spatio-temporal saliency values to the one or more pixels in the current frame of the one or more images of the scene, based on the optical flow and spatial distance of the one or more pixels in the current frame of the one or more images of the scene. This is done with respect to the one or more pixels associated in the previous frame of the one or more images of the scene. In accordance with an embodiment, the pixels with high contrast of optical flow may be assigned high spatio-temporal saliency values. Similarly, the pixels with low contrast of optical flow may be assigned low spatio-temporal saliency values. Based on the determination of the spatio-temporal saliency values of the one or more pixels in the current frame, the saliency generation unit 206 may be configured to generate a spatio-temporal saliency map. In accordance with an embodiment, the pixels with high spatio-temporal saliency value may be represented with high intensity of color, such as white, in the spatio-temporal saliency map. Similarly, the pixels with low spatio-temporal saliency value may be represented with low intensity of color, such as various shades of gray color, in the spatio-temporal saliency map.

In accordance with an embodiment, the saliency map for one or more images of the scene may be generated based on one or more factors, such as color, intensity, orientation, texture information of one or more pixels in the one or more images of the scene. The saliency generation unit 206 may be configured to determine color values of the one or more pixels from one or more color models, such as RGB color model. Based on the determined color values of the one or more pixels, the saliency generation unit 206 may determine an average color value of the current frame. Further, a spatial saliency value may be assigned to the one or more pixels, based on a difference between the average color value and the individual color values of the one or more pixels. A high spatial saliency value may be assigned to pixels when the difference exceeds a threshold value. Similarly, a low spatial saliency value may be assigned to pixels when the difference is less than the threshold value. Based on the assigned spatial saliency values, the saliency generation unit 206 may be configured to generate a spatial saliency map. In accordance with an embodiment, the pixels with higher spatial saliency value may be represented with high intensity of color, such as white, in the spatial saliency map. Similarly, the pixels with low spatial saliency value may be represented with low intensity of color, such as gray, in the spatial saliency map. The spatial saliency map may be generated by use of one or more spatial saliency map generation algorithms. The processor 202 may be configured to retrieve the spatial saliency map generation algorithms from the secondary memory 204b. Examples of such one or more spatial saliency map generation algorithms include, but are not limited to, an iterative method, a graph-based saliency (GBVS) method, a global-contrast based method, a spectral residual approach, and Itti-Koch method.

In accordance with an embodiment, the processor 202 may be configured to overlap the generated saliency map with each of the plurality of candidate segmented regions. In accordance with an embodiment, the generated saliency map may correspond to the saliency map based on the optical flow technique. In accordance with an embodiment, the generated saliency map correspond to the saliency map based on color, intensity, orientation, texture information of one or more pixels in the one or more images of the scene.

The processor 202 may be configured to validate the determination of the one of the candidate segmented regions as the region-of-interest based on the overlap. The determined candidate segmented region as the region-of-interest may be validated when the overlap between the candidate segmented region and the regions with high saliency values in the generated saliency map is a maximum as compared to other candidate segmented regions of the plurality of candidate segmented regions.

Figure 3B:
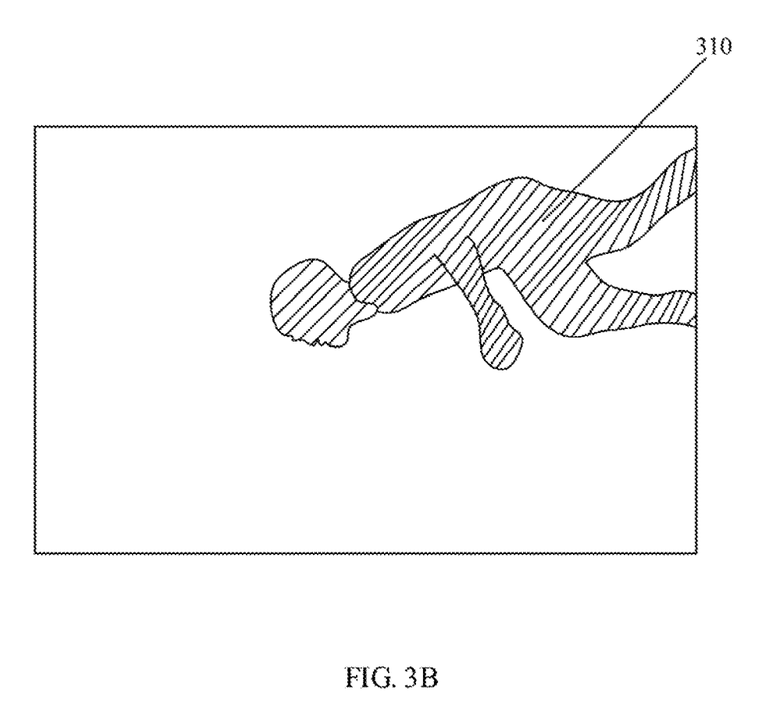
Figure 3C:
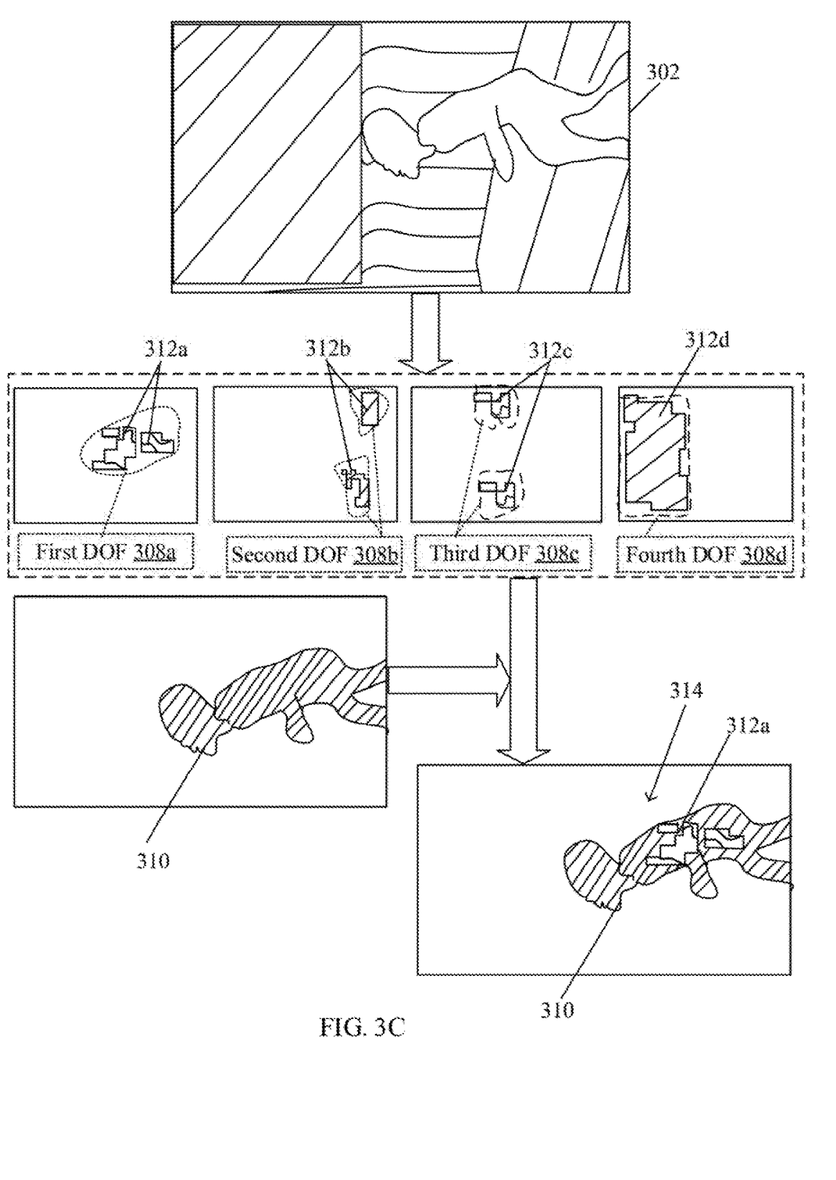

FIGS. 3A, 3B, and 3C, collectively, illustrate an exemplary scenario for implementation of the disclosed device and method for region-of-interest detection based on sensor data for autofocus, in accordance with an embodiment of the disclosure. FIGS. 3A, 3B, and 3C are explained in conjunction with elements from FIG. 1 and FIG. 2. With reference to FIG. 3A, there is shown a video 302 of a scene viewed by use of the image-capturing device 214 of the electronic device 102. The video 302 may include a moving person 304 and a background 306. Further, there is shown DOF information 308 overlaid on the video 302. The DOF information 308 may correspond to various DOF values associated with different depths, such as a first DOF 308a, a second DOF 308b, a third DOF 308c, and a fourth DOF 308d, associated with the moving person 304 and the background 306, as shown.

In accordance with the exemplary scenario, the one or more depth sensors 210a may be configured to generate the DOF information 308 based on the sensed depth values for different portions of the moving person 304 and the background 306. The DOF information 308 of the video 302 may comprise various DOF values. These DOF values displayed as "4", "5", "6", and "7", may represent different DOFs. In accordance with the exemplary scenario, the first DOF 308a may correspond to DOF value "4" assigned to a torso area of the moving person 304 in the video 302. The second DOF 308b may correspond to DOF value "5" assigned to limbs of the moving person 304 and certain portion, such as flooring, of the background 306 in the video 302. The third DOF 308c may correspond to DOF value "6" assigned to certain portion, such as flooring, of the background 306 further away in the scene. The fourth DOF 308d may correspond to DOF value "7" assigned to certain portion, such as wall portion, of the background 306 further away in the scene than the third DOF 308c.

With reference to FIG. 3B, there is shown a saliency map 310 generated by the saliency generation unit 206. The saliency map 310 may be generated from the video 302. The saliency map 310 may correspond to an optical flow based saliency map. It should be understood by one skilled in the art that the various embodiments are not limited to the optical flow based saliency map. Accordingly, other suitable saliency generation techniques such as the spatial saliency map or spatio-temporal saliency map may be utilized without departing from the spirit and scope of the disclosure.

With reference to FIG. 3C, there is further shown the video 302, a plurality of candidate segmented regions, such as a first candidate segmented region 312a, second candidate segmented region 312b, a third candidate segmented region 312c, and a fourth candidate segmented region 312d. There is further shown the saliency map 310 and an overlapped view 314.

In accordance with an embodiment, the processor 202 may be configured to segment the video 302 of the viewed scene into four candidate segmented regions, such as the first candidate segmented region 312a, the second candidate segmented region 312b, the third candidate segmented region 312c, and the fourth candidate segmented region 312d, as shown. The processor 202 may be configured to generate the candidate segmented regions 312a to 312d based on the associated DOF values, as shown in FIG. 3A. The DOF values may be generated by the one or more depth sensors 210a. For example, the region with DOF values as "4", such as the first DOF 308a, in the video 302 may be segmented to generate the first candidate segmented region 312a. The region with DOF values as "5", such as the second DOF 308b, in the video 302 may be segmented to generate the second candidate segmented region 312b. Similarly, the region with DOF value as "6", such as the third DOF 308c, in the video 302 may be segmented to generate the third candidate segmented region 312c and the region with DOF value as "7", such as the fourth DOF 308d, in the video 302 may be segmented to generate the fourth candidate segmented region 312d.

In accordance with an embodiment, the processor 202 may be further configured to overlap each of the plurality of candidate segmented regions 312a to 312d with the saliency map 310 generated by the saliency generation unit 206. The overlap between the first candidate segmented region 312a and the region with high saliency values in the saliency map 310 may be maximum as compared to other candidate segmented regions, such as the second candidate segmented region 312b, the third candidate segmented region 312c, and the fourth candidate segmented region 312d. The overlap between the first candidate segmented region 312a and the saliency map 310 is shown in the overlapped view 314. Subsequently, the first candidate segmented region 312a with DOF value as "4", such as the first DOF 308a, may be validated as the region-of-interest. Consequently, the first candidate segmented region 312a may be determined as the main region to autofocus. An image of the scene may then be captured with focus on the first candidate segmented region 312a. Thus, the various embodiments of the disclosure may provide a robust and an accurate detection of a region-of-interest for autofocus applications.

Figure 4:
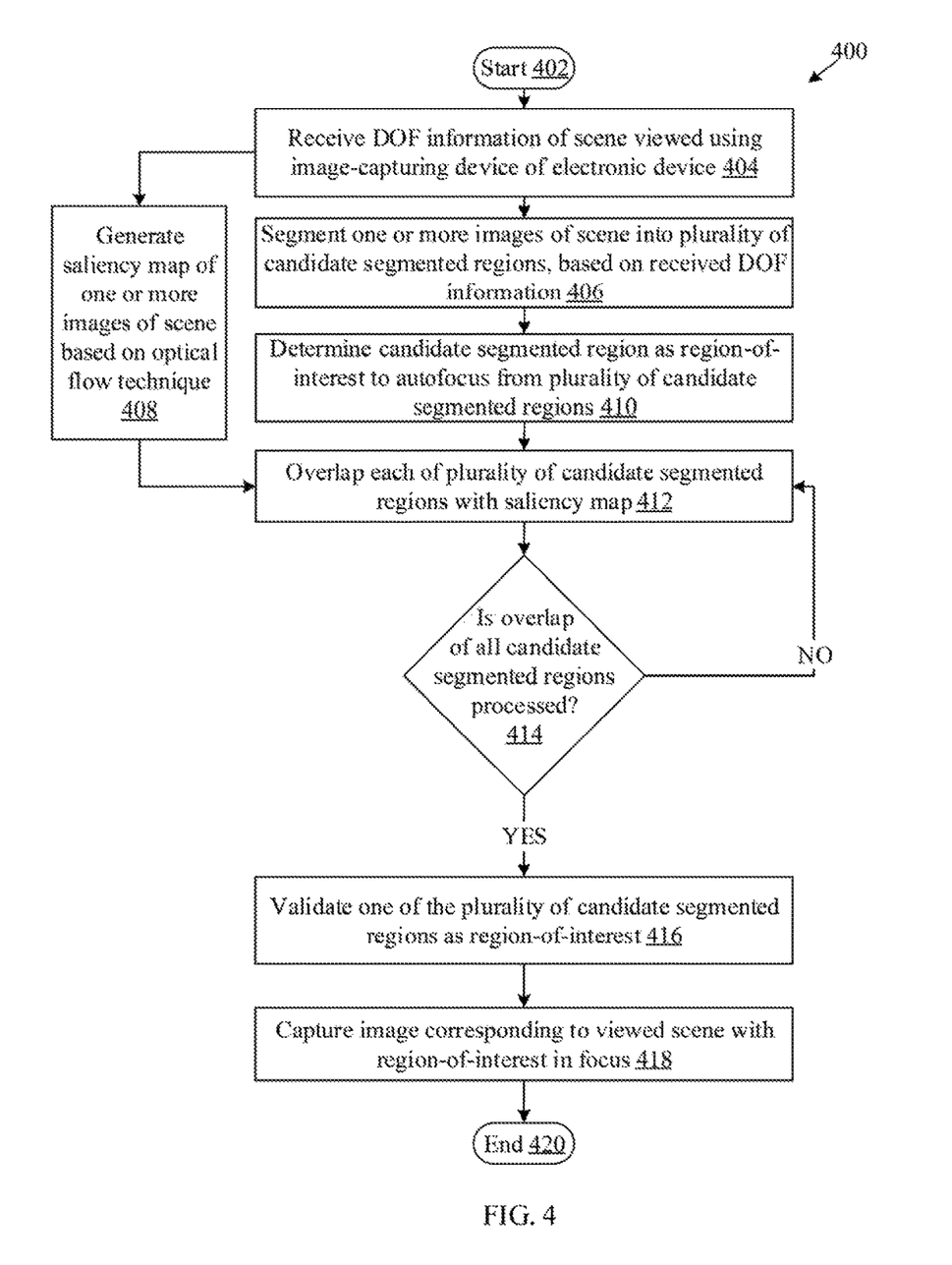
FIG. 4 depict a flowchart that illustrates an exemplary method for detection of regions in an image based on sensor data for autofocus, in accordance with an embodiment of the disclosure.

FIG. 4 depicts a flowchart that illustrates a method for region-of-interest detection for autofocus based on sensor data, in accordance with an embodiment of the disclosure. With reference to FIG. 4, there is shown a flow chart 400. The flow chart 400 is described in conjunction with FIGS. 1 and 2. The method starts at 402 and proceeds to 404.

At 404, DOF information of a scene viewed using image-capturing device 214 may be received. The DOF information may be received by the processor 202. The DOF information may be received from the one or more depth sensors 210a of the sensing device 210. An example of DOF information, such as the DOF information 308, is shown in FIG. 3A.

At 406, one or more images of the scene may be segmented into a plurality of candidate segmented regions. The one or more images may correspond to a video, such as the video 302, or a preview within the FOV of the image-capturing device 214 as viewed through the image-capturing device 214 before capturing of an image. The processor 202 may segment the one or more images of the scene based on the received DOF information 308. An example of segmentation to the plurality of candidate segmented regions, such as the first candidate segmented region 312a, the second candidate segmented region 312b, the third candidate segmented region 312c, and the fourth candidate segmented region 312d, is shown in FIG. 3C.

At 408, a saliency map of the one or images may be generated. In accordance with an embodiment, the generation of the saliency map be performed in parallel with the operations 406 and 410. An example of the saliency map, such as the saliency map 310, is shown in the FIG. 3B. At 410, a candidate segmented region from the plurality of candidate segmented regions may be determined as a region-of-interest for autofocus.

At 412, each of the plurality of candidate segmented regions may be overlapped with the generated saliency map. At 414, it may be determined whether the overlap of the entire candidate segmented regions from the plurality of candidate segmented regions with the saliency map is processed. In instances, when the overlap of all the candidate segmented regions with the saliency map is not processed, the control passes back to 412. In instances when the overlap of all the candidate segmented regions with the saliency map is processed, the control may pass to 416.

At 416, the determination of one of the plurality of candidate segmented regions as a region-of-interest may be validated. The validation may occur when the overlap between one of the plurality of candidate segmented regions and the regions with high saliency values in the generated saliency map is maximum as compared to other candidate segmented regions of the plurality of candidate segmented regions. An example of the overlapped view 314 is shown in FIG. 3C. At 418, an image, corresponding to the viewed scene, with the determined and validated region-of-interest in focus may be captured by the image-capturing device 214. Control passes to end 420.

In accordance with an embodiment of the disclosure, a device to detect regions based on the sensor data for autofocus is disclosed. The device (such as the electronic device 102 (FIG. 1) may comprise one or more circuits (such as the processor 202, the saliency generation unit 206, the transceiver 212, and/or other components of FIG. 2). The processor 202 may be configured to receive DOF information of a scene viewed by use of the image-capturing device 214 (FIG. 2) of the electronic device 102. The processor 202 may be further configured to segment one or more images of the scene into a plurality of candidate segmented regions based on the DOF information. The processor 202 may be further configured to determine one of the plurality of candidate segmented regions as a region-of-interest to autofocus on the determined candidate segmented region.

As traditional approaches of detecting region of interest were not specifically designed for autofocus applications. Such traditional approaches have inherent issues when applied to autofocus techniques used in image-capturing, sensor, and/or image-processing technologies. Usually, only one depth that corresponds to a certain region in image may be in focus. However, a region-of-interest detected with traditional approaches when applied to autofocus applications may fail or may result in inaccurate detection as only one depth may be focused. For example, the detected region with traditional approach may in reality have different depths. Further, using traditional approaches, the detected region and other regions in the scene may have the same depth. Thus, as a result of these inherent issues, the traditional approaches cannot be used for accurate detection of region-of-interest in an image that is to be captured, and the region-of-interest may be out of focus in the captured image.

In accordance with the disclosure, as the processor 202 segments the one or more images of the scene into the plurality of candidate segmented regions based on the DOF information, multiple candidate regions are thus available to the processor 202 to begin with the detection process. A robust and an accurate detection of a region-of-interest may be provided, as the requirement in this case is simplified to determine which one of these regions is the main region for autofocus. Thus, in an event that a video or a preview within the field-of-view of the image-capturing device 214 is viewed through the image-capturing device 214 before actual capturing of an image, the region-of-interest may be instantly and accurately detected by the processor 202 to enable capture of an image with automatic focus on the detected region-of-interest. As a result of the plurality of candidate segmented regions, the region-of-interest that corresponds to one of the determined plurality of candidate segmented regions, is determined in a faster computation time while improving image quality. Thus, an improvement in the technology of digital image processing, image-capturing technology, and image-sensors is provided as a result of the accurate detection of a region-of-interest for autofocus applications.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer to detect regions in an image/video based on sensor data. The set of instructions in the electronic device 102 may cause the machine and/or computer to perform the steps that comprise receipt of DOF information of a scene viewed by use of the image-capturing device 214 of the electronic device 102. The one or images of the scene may be segmented into a plurality of candidate segmented regions based on the received DOF information. One of the plurality of candidate segmented regions may be determined as a region-of-interest to autofocus on the determined candidate segmented region.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An electronic device comprising:
    an image capturing device configured to receive a scene; and
    one or more circuits configured to:
    receive depth of field (DOF) information of the scene;
    segment at least one image of said scene into a plurality of candidate segmented regions based on said DOF information;
    determine a first candidate segmented region of said plurality of candidate segmented regions as a region-of-interest to autofocus on said first candidate segmented region;
    generate a saliency map for said at least one image of said scene based on an optical flow technique; and
    overlap said saliency map with each of said plurality of candidate segmented regions for said determination of said first candidate segmented region as said region-of-interest.

2. The electronic device according to claim 1, wherein said saliency map for said at least one image of said scene is generated based on at least one of color, intensity, orientation, texture information of at least one or mom first pixel in said at least one image of said scene, or a motion value of at least one second pixel of at least one object in said at least one image of said scene.

3. The electronic device according to claim 1, wherein said one or more circuits are further configured to validate said determination of said first candidate segmented region of said plurality of candidate segmented regions as said region-of-interest based on said overlap between said first candidate segmented region and regions with saliency values greater than a threshold in said saliency map being maximum in comparison to said overlap between candidate segmented regions of said plurality of candidate segmented regions other than said first candidate segmented region and said regions with said saliency values greater than said threshold in said saliency map.

4. The electronic device according to claim 1, wherein said one or more circuits are further configured to determine a depth-of-interest based on calculation of at least one of a mean DOF value or a median DOF value of regions with saliency values greater than a threshold in said saliency map, wherein said determination of said first candidate segmented region as said region-of-interest is based on said depth-of-interest.

5. The electronic device according to claim 1, further comprising a depth sensor configured to assign a plurality of DOF values to a plurality of portions of said at least one image of said scene, and wherein said DOF information corresponds to the plurality of DOF values.

6. The electronic device according to claim 5, wherein said plurality of DOF values are overlaid on said at least one image of said scene.

7. The electronic device according to claim 1, wherein each of said plurality of candidate segmented regions comprises different DOF values.

8. The electronic device according to claim 1, wherein said determination of said first candidate segmented region as said region-of-interest is further based on an area of said plurality of candidate segmented regions.

9. The electronic device according to claim 1, wherein said determination of said first candidate segmented region as said region-of-interest is further based on at least one of a training-based classification method or at least one of specific rule, and wherein the training-based classification method is based on historical data corresponding to a set of candidate segmented regions obtained from previous segmentation operations.

10. The electronic device according to claim 1, wherein said one or more circuits are further configured to capture a first image corresponding to said scene with said region-of-interest in focus.

11. The electronic device according to claim 1, wherein said saliency map is generated in parallel to said segmentation of said at least one image of said scene.

12. A method, comprising:
    receiving, via an image capturing device, a scene;
    receiving, by one or more circuits of an electronic device, depth of field (DOF) information of the scene;
    segmenting, by said one or more circuits, at least one image of said scene into a plurality of candidate segmented regions based on said DOF information;
    determining, by said one or more circuits, a first candidate segmented region of said plurality of candidate segmented regions as a region-of-interest to autofocus on said first candidate segmented region;
    generating, by said one or more circuits, a saliency map for said at least one image of said scene based on an optical flow technique; and
    overlapping, by said one or more circuits, said saliency map with each of said plurality of candidate segmented regions for said determination of said first candidate segmented region as said region-of-interest.

13. The method according to claim 12, wherein said saliency map for said at least one image of said scene is generated based on at least one of color, intensity, orientation, texture information of at least one first pixel in said at least one image of said scene, or a motion value of at least one second pixel of at least one object in said at least one image of said scene.

14. The method according to claim 12, further comprising validating, by said one or more circuits, said determination of said first candidate segmented region of said plurality of candidate segmented regions as said region-of-interest based on said overlapping between said first candidate segmented region and regions with high saliency values in said saliency map being maximum in comparison to said overlapping between candidate segmented regions of said plurality of candidate segmented regions other than said first candidate segmented region and said regions with said high saliency values in said saliency map.

15. The method according to claim 12, further comprising assigning, by said one or more circuits, a plurality of DOF values to a plurality of portions of said at least one image of said scene, and wherein said DOF information corresponds to the plurality of DOF values.

16. The method according to claim 12, wherein each of said plurality of candidate segmented regions comprises different DOF values.

17. The method according to claim 12, wherein said determination of said first candidate segmented region as said region-of-interest is further based on an area of said plurality of candidate segmented regions.

18. The method according to claim 12, wherein said determination of said first candidate segmented region as said region-of-interest is further based on at least one of a training-based classification method or at least one of specific rule, and wherein the training-based classification method is based on historical data corresponding to a set of candidate segmented regions obtained from previous segmentation operations.

19. The method according to claim 12, further comprising capturing, by said one or more circuits, a first image corresponding to said scene with said region-of-interest in focus.

* * * * *